United States Patent
Murakami et al.

(10) Patent No.: US 7,428,029 B2
(45) Date of Patent: Sep. 23, 2008

(54) OPTICAL FILM AND ITS MANUFACTURING METHOD

(75) Inventors: Nao Murakami, Ibaraki (JP); Hiroyuki Yoshimi, Ibaraki (JP); Yuuichi Nishikouji, Ibaraki (JP); Masaki Hayashi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 454 days.

(21) Appl. No.: 10/522,380

(22) PCT Filed: Jul. 29, 2003

(86) PCT No.: PCT/JP03/09568

§ 371 (c)(1),
(2), (4) Date: Sep. 1, 2005

(87) PCT Pub. No.: WO2004/011970

PCT Pub. Date: Feb. 5, 2004

(65) Prior Publication Data

US 2006/0055853 A1     Mar. 16, 2006

(30) Foreign Application Priority Data

Jul. 30, 2002   (JP) ............................. 2002-220759

(51) Int. Cl.
*G02F 1/1335* (2006.01)
(52) U.S. Cl. ...................................... 349/117; 349/118
(58) Field of Classification Search ................. 349/117, 349/118; 359/279, 290
See application file for complete search history.

(56) References Cited

U.S. PATENT DOCUMENTS

| 5,249,071 A | 9/1993 | Yoshimizu et al. |
| 5,344,916 A | 9/1994 | Harris et al. |
| 5,395,918 A | 3/1995 | Harris et al. |

(Continued)

FOREIGN PATENT DOCUMENTS

EP     1 160 591 A1 *  5/2001

(Continued)

OTHER PUBLICATIONS

Chinese Office Action for Application No. 03818329 dated Jun. 15, 2007.

*Primary Examiner*—Mike Qi
(74) *Attorney, Agent, or Firm*—Westerman, Hattori, Daniels & Adrian, LLP.

(57) ABSTRACT

The present invention relates to an optical film that is excellent in optical properties and can be produced at low cost. In the optical film formed by laminating a transparent polymer film layer and a birefringent layer of a non-liquid crystalline polymer, the birefringent layer satisfies a condition represented by $nx \geq ny > nz$ and the in-plane retardation of the transparent polymer film layer is 50 nm or less. In the above formula, nx, ny and nz are the refraction indices in the X-, Y- and Z-axes directions of the birefringent layer, respectively. The X-axis direction is the axial direction in which the refraction index shows a maximum value in the in-plane direction of the birefringent layer, the Y-axis direction is the axial direction perpendicular to the X-axis direction in the plane, and the Z-axis direction is the thickness direction perpendicular to the X- and Y-axes directions.

29 Claims, 2 Drawing Sheets

U.S. PATENT DOCUMENTS

| | | | |
|---|---|---|---|
| 5,480,964 | A | 1/1996 | Harris et al. |
| 5,580,950 | A | 12/1996 | Harris et al. |
| 6,074,709 | A | 6/2000 | Ezzell et al. |
| 6,914,708 | B2 * | 7/2005 | Mi .............................. 359/247 |
| 6,964,814 | B2 * | 11/2005 | Fujii et al. ................ 428/423.1 |
| 7,128,952 | B2 * | 10/2006 | Murakami et al. ........... 428/1.3 |
| 2005/0096431 | A1 | 5/2005 | Fujii et al. |

FOREIGN PATENT DOCUMENTS

| | | |
|---|---|---|
| EP | 1 160 591 | 12/2001 |
| EP | 1160591 | 12/2001 |
| JP | 3-24502 | 2/1991 |
| JP | 3-33719 | 2/1991 |
| JP | 4-194820 | 7/1992 |
| JP | 8-160221 | 6/1996 |
| JP | 8-248202 | 9/1996 |
| JP | 8-511812 | 12/1996 |
| JP | 9-281337 | 10/1997 |
| JP | 10-508048 | 8/1998 |
| JP | 2000-190385 | 7/2000 |
| JP | 2000-511296 | 8/2000 |
| JP | 2001-49110 | 2/2001 |
| JP | 2001-91746 | 4/2001 |
| JP | 2001-290023 | 10/2001 |
| JP | 2001-343529 | 12/2001 |
| WO | WO 94/24191 | 10/1994 |
| WO | WO 96/11967 | 4/1996 |
| WO | WO 97/44704 | 11/1997 |

* cited by examiner

Without rainbow-colored irregularity

With rainbow-colored irregularity

OPTICAL FILM AND ITS MANUFACTURING METHOD

TECHNICAL FIELD

The present invention relates to an optical film and a method for producing the same.

BACKGROUND ART

In liquid crystal displays, various optical films are used for improving the display performance. For example, an optical film (retardation film) that satisfies the condition (1) below is arranged between a liquid crystal cell and a polarizing plate, and used for compensating the viewing angle of a liquid crystal display. Such an optical film is produced by stretching a polymer film (see JP H03(1991)-33719 A, JP H03(1991)-24502 A, and JP H04(1992)-194820 A).

$$nx \geq ny > nz \quad (1)$$

In the above formula (1), nx, ny and nz indicate respectively refractive indices in directions of an X-axis, a Y-axis, and a Z-axis in the optical film. The X-axis direction is a direction showing a maximum refractive index within the plane of the optical film, the Y-axis direction is a direction perpendicular to the X-axis direction within the plane, and the Z-axis direction is a thickness direction and is perpendicular to the X- and Y-axes directions.

However, in a producing method that includes a stretching process, conditions regarding the stretching ratio and stretching direction or the like must be set in detail, which will require a precise control of the stretching and thus the processes will be complicated. Moreover in the stretching, a bowing phenomenon must be solved. Furthermore, the stretching requires use of a polymer film of a certain degree of thickness. The thus obtained optical film will be thick, and as a result, the liquid crystal display will be thick as well.

In some other methods, optical films can be produced without a stretching treatment. Such an optical film can be produced, for example, by applying a polymer solution onto a flat-surface base and removing the solvent of the solution by evaporation. Examples of the polymer include polyamide, polyimide, polyester, polyetherketone, polyamideimide, polyesterimide and the like (see U.S. Pat. No. 5,344,916, U.S. Pat. No. 5,395,918, JP H08(1996)-511812 A, U.S. Pat. No. 5,480,964, U.S. Pat. No. 5,580,950, and U.S. Pat. No. 6,074,709) For the base, an inorganic base such as a SUS belt, a copper thin sheet, a glass sheet, a Si wafer or the like are used mainly. However, since the inorganic base itself cannot be used in a liquid crystal display, the optical film formed on the base must be transferred onto a polarizer or the like. Alternatively, the optical film formed on the base will be peeled off and rolled. As a result, use of an inorganic base will complicate a process for producing an optical film, and the inorganic base may increase the cost.

As mentioned above, there are problems in the method for producing conventional optical films. Moreover, the optical films are required to have further improved optical properties.

DISCLOSURE OF INVENTION

Therefore, an object of the present invention is to provide an optical film that can be produced in a simple manner at a low cost and that has excellent optical properties, and also a method for producing the same.

For the object, an optical film of the present invention is formed of a transparent polymer film layer and a birefringent layer formed of a non-liquid crystalline polymer that are laminated together, wherein the birefringent layer satisfies the condition represented by the following formula (1), and the transparent polymer film layer has an in-plane retardation of not more than 50 nm.

$$nx \geq ny > nz \quad (1)$$

In the above formula (1), nx, ny and nz indicate respectively refractive indices in directions of an X-axis, a Y-axis, and a Z-axis in the birefringent layer. The X-axis direction is a direction showing a maximum refractive index within the plane of the birefringent layer, the Y-axis direction is a direction perpendicular to the X-axis direction within the plane, and the Z-axis direction is a thickness direction and is perpendicular to the X- and Y-axes directions.

Next, a method for producing an optical film of the present invention is a method for producing an optical film formed of a transparent polymer film layer and a birefringent layer that are laminated together, the method including steps of preparing or providing a transparent polymer film having an in-plane retardation of not more than 50 nm, applying a solution of a non-liquid crystalline polymer thereon, removing a solvent of the solution by evaporation so as to form a birefringent layer, and adjusting the birefringent layer to satisfy the condition represented by the above formula (1).

An optical film of the present invention is such that the birefringent layer is laminated on the transparent polymer film layer used as a base. Accordingly, the optical film can be used in a laminated state, thus it does not require operations for peeling the film off from a base or rolling the film. Moreover, the transparent polymer film layer is cost-effective. As a result, the optical film of the present invention can be produced in a simple manner at a low cost when compared to a conventional method. Also, in the optical film of the present invention, the transparent polymer film layer has an in-plane retardation of not more than 50 nm. Therefore, the retardation for the entire optical film can be adjusted to be within a proper range, and thus, the optical film is excellent in the optical properties such as a contrast and viewing angle.

PREFERRED MODE FOR CARRYING OUT THE INVENTION

The present invention will be described further below.

Figure 4:
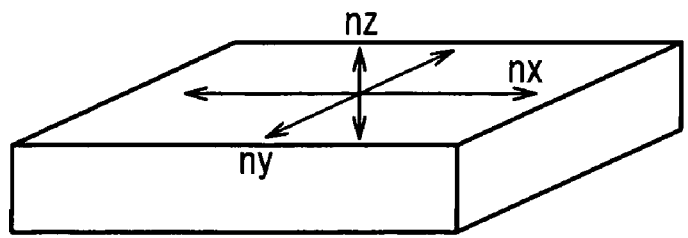
FIG. 4 shows an example of axial directions in an optical film of the present invention.

The birefringent layer in an optical film of the present invention is required to satisfy the above-described condition of formula (1). FIG. 4 shows an example of refractive indices ny, ny and nz in the birefringent layer. As shown in this figure, nx, ny and nz indicate respectively refractive indices in directions of an X-axis, a Y-axis, and a Z-axis in the birefringent layer. The X-axis direction is a direction showing a maximum refractive index within the plane of the birefringent layer, the Y-axis direction is a direction perpendicular to the X-axis direction within the plane, and the Z-axis direction is a thickness direction and is perpendicular to the X- and Y-axes directions.

An optical property nx=ny>nz denotes an optical uniaxiality, and an optical film having this property is called generally as a C-plate. An optical property nx>ny>nz denotes an optical biaxiality. In the case of an optical uniaxiality, nx and ny coincide with each other in principle, but actually measured values are often accompanied by errors. When the birefringent layer has a thickness (d) of, for example, 0.1 μm to 50 μm and Δnd=(nx−ny)·d<5 nm, the optical property of the birefringent layer is considered to be uniaxial. When Δnd exceeds the range, the optical property of the birefringent layer is considered to be biaxial. Since the birefringent layer of the present invention can be optically uniaxial or biaxial, strict distinctions are not required.

For the optical film of the present invention and for the method of producing the same, it is preferable that a refractive index Δn(a) of the birefringent layer and a refractive index Δn(b) of the transparent polymer film layer satisfy any of the following conditions represented by the following formulae (2) to (7). By satisfying the conditions, the optical properties such as a contrast and viewing angle will be improved further. Among the following formulae (2) to (7), the latter one is further preferred.

$$\Delta n(a) > \Delta n(b) \times 10 \qquad (2)$$

$$\Delta n(a) > \Delta n(b) \times 15 \qquad (3)$$

$$\Delta n(a) > \Delta n(b) \times 20 \qquad (4)$$

$$\Delta n(a) > \Delta n(b) \times 30 \qquad (5)$$

$$\Delta n(a) > \Delta n(b) \times 40 \qquad (6)$$

$$\Delta n(a) > \Delta n(b) \times 50 \qquad (7)$$

For the optical film of the present invention and for the method for producing the same, a refractive index (Δn) of the entire optical film is preferably in a range of 0.0005 to 0.5. When Δn is 0.0005 or more, a thin optical film can be provided. And when Δn is 0.5 or less, the retardation can be controlled easily. A more preferable range for the Δn is from 0.001 to 0.2, and further preferably, from 0.002 to 0.15.

For the optical film of the present invention and for the method for producing the same, non-liquid crystalline polymers for forming the birefringent layer are not limited particularly, but the examples include polyamide, polyimide, polyester, polyether ketone, polyamideimide, polyester imide, and a mixture thereof.

For the optical film of the present invention and for the method for producing the same, resins for forming the transparent polymer film layer are not limited particularly, but the examples thereof include acetate resin, polyester resin, polyethersulfone resin, polysulfone resin, polycarbonate resin, polyamide resin, polyimide resin, polyolefin resin, acrylic resin, polynorbornene resin, cellulose resin, polyarylate resin, polystyrene resin, polyvinyl alcohol resin, polyvinyl chloride resin, polyvinylidene chloride resin, polyacrylic resin, a mixed resin thereof, a liquid crystal polymer; and a mixture of a thermoplastic resin whose side chain has a substituted or unsubstituted imide group and a thermoplastic resin whose side chain has a substituted or unsubstituted phenyl group and a nitrile group. An example of the acetate resin is triacetyl acetate. An example of the mixture of a thermoplastic resin whose side chain has a substituted or unsubstituted imide group and a thermoplastic resin whose side chain has a substituted or unsubstituted phenyl group and a nitrile group is a mixed resin of an alternating copolymer made of isobutene and N-methylene maleimide and an acrylonitrile-styrene copolymer.

According to the optical film of the present invention and the method for producing the same, the transparent polymer film layer is not limited particularly, but it can be produced by shaping a resin as a raw material into a film and stretching. In the method for producing the optical film of the present invention, the transparent polymer film layer and the birefringent layer are laminated, and then the laminate can be stretched or shrunk.

According to the optical film of the present invention and the method for producing the same, the transparent polymer film layer can be used as a transparent protective film for the polarizing plate.

A polarizing plate of the present invention includes an optical film and a polarizer, and the optical film is the optical film of the present invention. It is preferable that the transparent polymer film layer of the optical film functions also as a transparent protective film of the polarizing plate. It is also preferable that the optical film functions as an optically-compensating layer.

A liquid crystal panel of the present invention includes a liquid crystal cell and an optical member, wherein the optical member is arranged on at least one surface of the liquid crystal cell, and the optical member is the optical film of the present invention or the polarizing plate of the present invention. The type of the liquid crystal cell of the present invention is not limited particularly, but the examples thereof include an STN (Super Twisted Nematic) cell, a TN (Twisted Nematic) cell, an IPS (In-Plane Switching) cell, a VA (Vertical Aligned) cell, an OCB (Optically Compensated Birefringence) cell, a HAN (Hybrid Aligned Nematic) cell, and an ASAM (Axially Symmetric Aligned Microcell) cell. It is particularly preferable that the optical film of the present invention is applied to the VA cell or the OCB cell.

A liquid crystal display of the present invention includes the liquid crystal panel of the present invention.

A self-light-emitting display of the present invention includes at least one of the optical film of the present invention and the polarizing plate of the present invention. An example of the self-light-emitting display is an organic EL display.

An example of a method for producing an optical film of the present invention follows. The optical film of the present invention can be produced, for example, by preparing a transparent polymer film having an in-plane retardation of not more than 50 nm, applying a non-liquid crystalline polymer solution thereon, removing a solvent in the solution by evaporation so as to form a birefringent layer, and adjusting the birefringent layer so as to satisfy the condition represented by the above formula (1).

For the non-liquid crystalline polymer used for forming the birefringent layer, as mentioned above, polymers such as polyamide, polyimide, polyester, polyether ketone, polyarylether ketone, polyamideimide, and polyester imide are preferred in light of, for example, the excellent heat resistance, chemical resistance, transparency and rigidity. Any of these polymers can be used alone, or can be used as a mixture of at least two kinds of polymers having different functional groups, e.g., a mixture of polyarylether ketone and polyamide. Among these polymers, polyimide is particularly preferred for the high transparency, high alignment and high stretching properties.

The molecular weight of the polymer is not limited particularly, but, for example, the weight average molecular weight (Mw) is preferably in a range of 1,000 to 1,000,000, more preferably, in a range of 2,000 to 500,000.

As the polyimide, it is preferable to use a polyimide that has a high in-plane alignment and is soluble in an organic solvent. For example, it is possible to use a condensation polymer of 9,9-bis(aminoaryl)fluorene and an aromatic tetracarboxylic dianhydride disclosed in JP 2000-511296 A, and more specifically, a polymer containing at least one repeating unit represented by the formula (1) below.

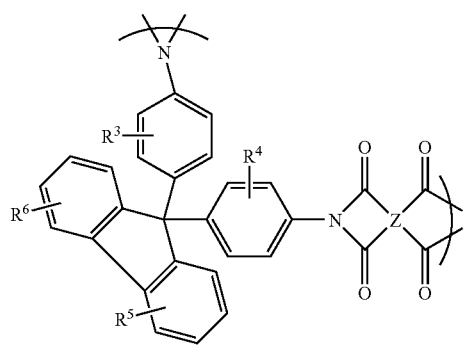

(1)

In the above formula (1), $R^3$ to $R^6$ are each at least one substituent selected independently from the group consisting of hydrogen, halogen, a phenyl group, a phenyl group substituted with 1 to 4 halogen atoms or a $C_{1-10}$ alkyl group, and a $C_{1-10}$ alkyl group. Preferably, $R^3$ to $R^6$ are each at least one substituent selected independently from the group consisting of halogen, a phenyl group, a phenyl group substituted with 1 to 4 halogen atoms or a $C_{1-10}$ alkyl group, and a $C_{1-10}$ alkyl group.

In the above formula (1), Z is, for example, a $C_{6-20}$ quadrivalent aromatic group, and preferably is a pyromellitic group, a polycyclic aromatic group, a derivative of a polycyclic aromatic group or a group represented by the formula (2) below.

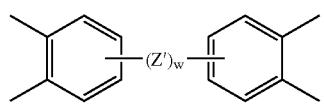

(2)

In the formula (2) above, Z' is, for example, a covalent bond, a $C(R^7)_2$ group, a CO group, an O atom, an S atom, an $SO_2$ group, an $Si(C_2H_5)_2$ group or an $NR^8$ group. When there are plural Z's, they may be the same or different. Also, w is an integer from 1 to 10. $R^7$s independently are hydrogen or $C(R^9)_3$. $R^8$ is hydrogen, a $C_{1-20}$ alkyl group or a $C_{6-20}$ aryl group, and when there are plural $R^8$s, they may be the same or different. $R^9$s independently are hydrogen, fluorine or chlorine.

The above-mentioned polycyclic aromatic group may be, for example, a quadrivalent group derived from naphthalene, fluorene, benzofluorene or anthracene. Further, a substituted derivative of the above-mentioned polycyclic aromatic group may be the above-mentioned polycyclic aromatic group substituted with at least one group selected from the group consisting of, for example, a $C_{1-10}$ alkyl group, a fluorinated derivative thereof and halogen such as F and Cl.

Other than the above, homopolymer whose repeating unit is represented by the general formula (3) or (4) below or polyimide whose repeating unit is represented by the general formula (5) below disclosed in JP H08(1996)-511812 A may be used, for example. The polyimide represented by the formula (5) below is a preferable mode of the homopolymer represented by the formula (3) below.

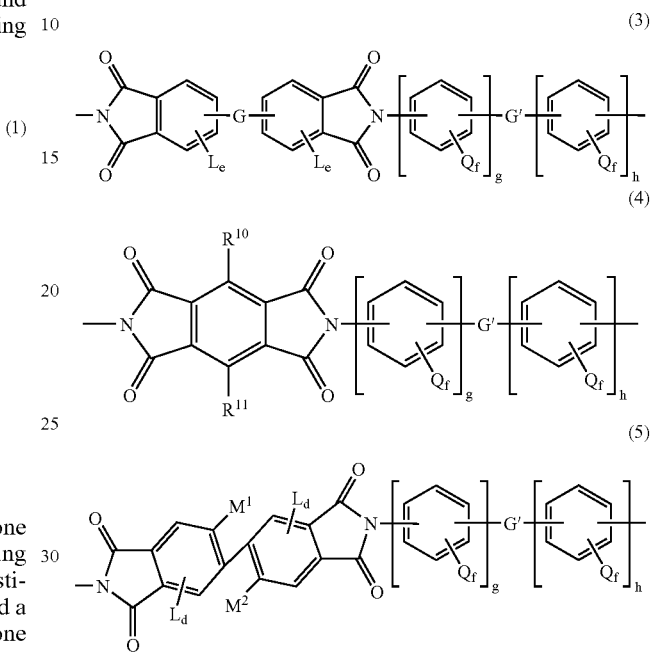

In the above general formulae (3) to (5), G and G' each are a group selected independently from the group consisting of, for example, a covalent bond, a $CH_2$ group, a $C(CH_3)_2$ group, a $C(CF_3)_2$ group, a $C(CX_3)_2$ group (wherein X is halogen), a CO group, an O atom, an S atom, an $SO_2$ group, an $Si(CH_2CH_3)_2$ group and an $N(CH_3)$ group, and G and G' may be the same or different.

In the above formulae (3) and (5), L is a substituent, and d and e indicate the number of substitutions therein. L is, for example, halogen, a $C_{1-3}$ alkyl group, a halogenated $C_{1-3}$ alkyl group, a phenyl group or a substituted phenyl group, and when there are plural Ls, they may be the same or different. The above-mentioned substituted phenyl group may be, for example, a substituted phenyl group having at least one substituent selected from the group consisting of halogen, a $C_{1-3}$ alkyl group and a halogenated $C_{1-3}$ alkyl group. Also, the above-mentioned halogen may be, for example, fluorine, chlorine, bromine or iodine. d is an integer from 0 to 2, and e is an integer from 0 to 3.

In the above formulae (3) to (5), Q is a substituent, and f indicates the number of substitutions therein. Q may be, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group and a substituted alkyl ester group and, when there are plural Qs, they may be the same or different. The above-mentioned halogen may be, for example, fluorine, chlorine, bromine or iodine. The above-mentioned substituted alkyl group may be, for example, a halogenated alkyl group. Also, the above-mentioned substituted aryl group may be, for example, a halogenated aryl group. f is an integer from 0 to 4, and g and h respectively are an integer from 0 to 3 and an integer from 1 to 3. Furthermore, it is preferable that g and h are larger than 1.

In the above formula (4), $R^{10}$ and $R^{11}$ are each groups selected independently from the group consisting of hydrogen, halogen, a phenyl group, a substituted phenyl group, an alkyl group and a substituted alkyl group. It is particularly preferable that $R^{10}$ and $R^{11}$ independently are a halogenated alkyl group.

In the above formula (5), $M^1$ and $M^2$ may be the same or different and, for example, halogen, a $C_{1-3}$ alkyl group, a halogenated $C_{1-3}$ alkyl group, a phenyl group or a substituted phenyl group. The above-mentioned halogen may be, for example, fluorine, chlorine, bromine or iodine. The above-mentioned substituted phenyl group may be, for example, a substituted phenyl group having at least one substituent selected from the group consisting of halogen, a $C_{1-3}$ alkyl group and a halogenated $C_{1-3}$ alkyl group.

A specific example of polyimide represented by the formula (3) includes polyimide represented by the formula (6) below.

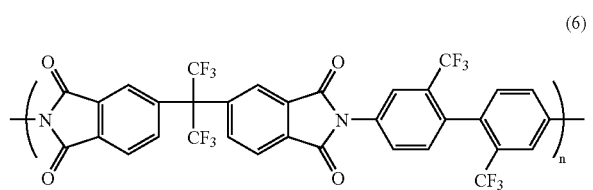

(6)

Moreover, the above-mentioned polyimide may be, for example, copolymer obtained by copolymerizing acid dianhydride and diamine other than the above-noted skeleton (repeating unit) suitably.

The above-mentioned acid dianhydride may be, for example, aromatic tetracarboxylic dianhydride. The aromatic tetracarboxylic dianhydride may be, for example, pyromellitic dianhydride, benzophenone tetracarboxylic dianhydride, naphthalene tetracarboxylic dianhydride, heterocyclic aromatic tetracarboxylic dianhydride or 2,2'-substituted biphenyl tetracarboxylic dianhydride.

The pyromellitic dianhydride may be, for example, pyromellitic dianhydride, 3,6-diphenyl pyromellitic dianhydride, 3,6-bis(trifluoromethyl)pyromellitic dianhydride, 3,6-dibromopyromellitic dianhydride or 3,6-dichloropyromellitic dianhydride. The benzophenone tetracarboxylic dianhydride may be, for example, 3,3',4,4'-benzophenone tetracarboxylic dianhydride, 2,3,3',4'-benzophenone tetracarboxylic dianhydride or 2,2',3,3'-benzophenone tetracarboxylic dianhydride. The naphthalene tetracarboxylic dianhydride may be, for example, 2,3,6,7-naphthalene-tetracarboxylic dianhydride, 1,2,5,6-naphthalene-tetracarboxylic dianhydride or 2,6-dichloro-naphthalene-1,4,5,8-tetracarboxylic dianhydride. The heterocyclic aromatic tetracarboxylic dianhydride may be, for example, thiophene-2,3,4,5-tetracarboxylic dianhydride, pyrazine-2,3,5,6-tetracarboxylic dianhydride or pyridine-2,3,5,6-tetracarboxylic dianhydride. The 2,2'-substituted biphenyl tetracarboxylic dianhydride may be, for example, 2,2'-dibromo-4,4',5,5'-biphenyl tetracarboxylic dianhydride, 2,2'-dichloro-4,4',5,5'-biphenyl tetracarboxylic dianhydride or 2,2'-bis(trifluoromethyl)-4,4',5,5'-biphenyl tetracarboxylic dianhydride.

Other examples of the aromatic tetracarboxylic dianhydride may include 3,3',4,4'-biphenyl tetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-bis(3,4-dicarboxyphenyl)-2,2-diphenylpropane dianhydride, bis(3,4-dicarboxyphenyl)ether dianhydride, 4,4'-oxydiphthalic dianhydride, bis(3,4-dicarboxyphenyl)sulfonic dianhydride, 3,3',4,4'-diphenylsulfone tetracarboxylic dianhydride, 4,4'-[4,4'-isopropylidene-di(p-phenyleneoxy)]bis(phthalic dianhydride), N,N-(3,4-dicarboxyphenyl)-N-methylamine dianhydride and bis(3,4-dicarboxyphenyl)diethylsilane dianhydride.

Among the above, the aromatic tetracarboxylic dianhydride preferably is 2,2'-substituted biphenyl tetracarboxylic dianhydride, more preferably is 2,2'-bis(trihalomethyl)-4,4',5,5'-biphenyl tetracarboxylic dianhydride, and further preferably is 2,2'-bis(trifluoromethyl)-4,4',5,5'-biphenyl tetracarboxylic dianhydride.

The above-mentioned diamine may be, for example, aromatic diamine. Specific examples thereof include benzenediamine, diaminobenzophenone, naphthalenediamine, heterocyclic aromatic diamine and other aromatic diamines.

The benzenediamine may be, for example, diamine selected from the group consisting of benzenediamines such as o-, m- and p-phenylenediamine, 2,4-diaminotoluene, 1,4-diamino-2-methoxybenzene, 1,4-diamino-2-phenylbenzene and 1,3-diamino-4-chlorobenzene. Examples of the diaminobenzophenone may include 2,2'-diaminobenzophenone and 3,3'-diaminobenzophenone. The naphthalenediamine may be, for example, 1,8-diaminonaphthalene or 1,5-diaminonaphthalene. Examples of the heterocyclic aromatic diamine may include 2,6-diaminopyridine, 2,4-diaminopyridine and 2,4-diamino-S-triazine.

Further, other than the above, the aromatic diamine may be 4,4'-diaminobiphenyl, 4,4'-diaminodiphenyl methane, 4,4'-(9-fluorenylidene)-dianiline, 2,2'-bis(trifluoromethyl)-4,4'-diaminobiphenyl, 3,3'-dichloro-4,4'-diaminodiphenyl methane, 2,2'-dichloro-4,4'-diaminobiphenyl, 2,2',5,5'-tetrachlorobenzidine, 2,2-bis(4-aminophenoxyphenyl) propane, 2,2-bis(4-aminophenyl)propane, 2,2-bis(4-aminophenyl)-1,1,1,3,3,3-hexafluoropropane, 4,4'-diamino diphenyl ether, 3,4'-diamino diphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3,-hexafluoropropane, 4,4'-diamino diphenyl thioether or 4,4'-diaminodiphenylsulfone.

The polyetherketone may be, for example, polyaryletherketone represented by the general formula (7) below, which is disclosed in JP 2001-49110 A.

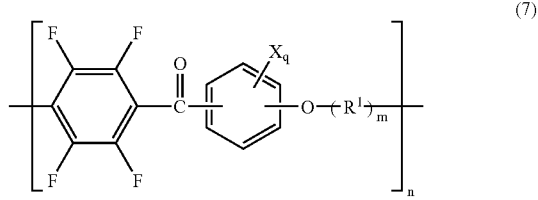

(7)

In the above formula (7), X is a substituent, and q is the number of substitutions therein. X is, for example, a halogen atom, a lower alkyl group, a halogenated alkyl group, a lower alkoxy group or a halogenated alkoxy group, and when there are plural Xs, they may be the same or different.

The halogen atom may be, for example, a fluorine atom, a bromine atom, a chlorine atom or an iodine atom, and among these, a fluorine atom is preferable. The lower alkyl group preferably is a $C_{1-6}$ lower straight or branched alkyl group and more preferably is a $C_{1-4}$ straight or branched chain alkyl group, for example. More specifically, it preferably is a methyl group, an ethyl group, a propyl group, an isopropyl group, a butyl group, an isobutyl group, a sec-butyl group or a tert-butyl group, and particularly preferably is a methyl group or an ethyl group. The halogenated alkyl group may be, for example, a halide of the above-mentioned lower alkyl group such as a trifluoromethyl group. The lower alkoxy group preferably is a $C_{1-6}$ straight or branched chain alkoxy group and more preferably is a $C_{1-4}$ straight or branched chain alkoxy group, for example. More specifically, it further preferably is a methoxy group, an ethoxy group, a propoxy group, an isopropoxy group, a butoxy group, an isobutoxy group, a sec-butoxy group or a tert-butoxy group, and particularly preferably is a methoxy group or an ethoxy group. The halogenated alkoxy group may be, for example, a halide of the above-mentioned lower alkoxy group such as a trifluoromethoxy group.

In the above formula (7), q is an integer from 0 to 4. In the formula (7), it is preferable that q=0 and a carbonyl group and an oxygen atom of an ether that are bonded to both ends of a benzene ring are present at para positions.

Also, in the above formula (7), $R^1$ is a group represented by the formula (8) below, and m is an integer of 0 or 1.

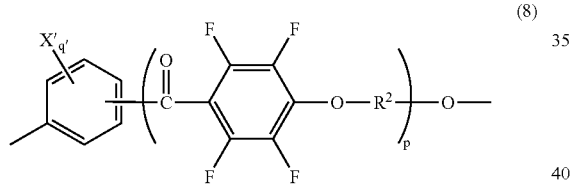

(8)

In the above formula (8), X' is a substituent and is the same as X in the formula (7), for example. In the formula (8), when there are plural X's, they may be the same or different. q' indicates the number of substitutions in the X' and is an integer from 0 to 4, preferably, q'=0. In addition, p is an integer of 0 or 1.

In the formula (8), $R^2$ is a divalent aromatic group. This divalent aromatic group is, for example, an o-, m- or p-phenylene group or a divalent group derived from naphthalene, biphenyl, anthracene, o-, m- or p-terphenyl, phenanthrene, dibenzofuran, biphenyl ether or biphenyl sulfone. In these divalent aromatic groups, hydrogen that is bonded directly to the aromatic may be substituted with a halogen atom, a lower alkyl group or a lower alkoxy group. Among them, the $R^2$ preferably is an aromatic group selected from the group consisting of the formulae (9) to (15) below.

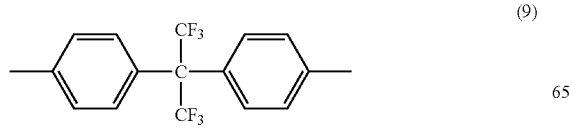

(9)

-continued

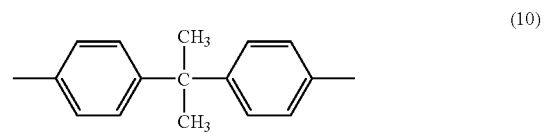

(10)

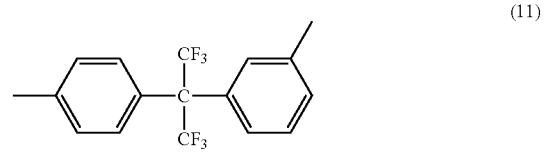

(11)

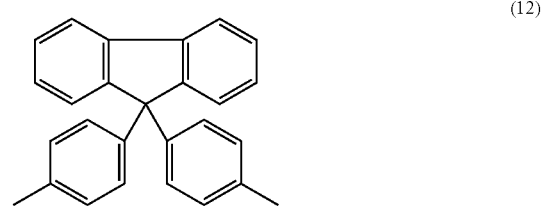

(12)

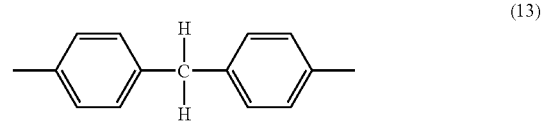

(13)

(14)

(15)

In the above formula (7), the $R^1$ preferably is a group represented by the formula (16) below, wherein $R^2$ and p are equivalent to those in the above-noted formula (8).

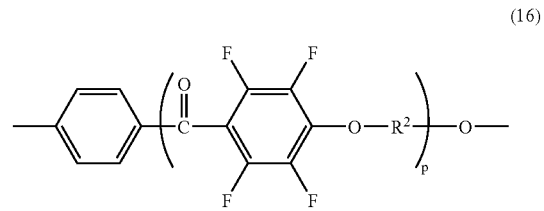

(16)

Furthermore, in the formula (7), n indicates a degree of polymerization ranging, for example, from 2 to 5000 and preferably from 5 to 500. The polymerization may be composed of repeating units with the same structure or with different structures. In the latter case, the polymerization form of the repeating units may be block polymerization or random polymerization.

Moreover, it is preferable that an end on a p-tetrafluorobenzoylene group side of the polyaryletherketone represented by the formula (7) is fluorine and an end on an oxyalkylene group side thereof is a hydrogen atom. Such a polyaryletherketone can be represented by the general formula (17) below. In the formula below, n indicates a degree of polymerization as in the formula (7).

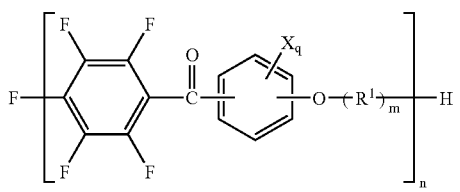
(17)

Specific examples of the polyaryletherketone represented by the formula (7) may include those represented by the formulae (18) to (21) below, wherein n indicates a degree of polymerization as in the formula (7).

covalent bond, a $C_2$ alkylene group, a halogenated $C_2$ alkylene group, a $CH_2$ group, a $C(CX_3)_2$ group (wherein X is halogen or hydrogen), a CO group, an O atom, an S atom, an $SO_2$ group, an $Si(R)_2$ group and an N(R) group, and Es may be the same or different. In the above-mentioned E, R is at least one of a $C_{1-3}$ alkyl group and a halogenated $C_{1-3}$ alkyl group and present at a meta position or a para position with respect to a carbonyl functional group or a Y group.

Further, in the above formula (22), A and A' are substituents, and t and z respectively indicate the numbers of substitutions therein. Additionally, p is an integer from 0 to 3, q is an integer from 1 to 3, and r is an integer from 0 to 3.

The above-mentioned A is selected from the group consisting of, for example, hydrogen, halogen, a $C_{1-3}$ alkyl group, a

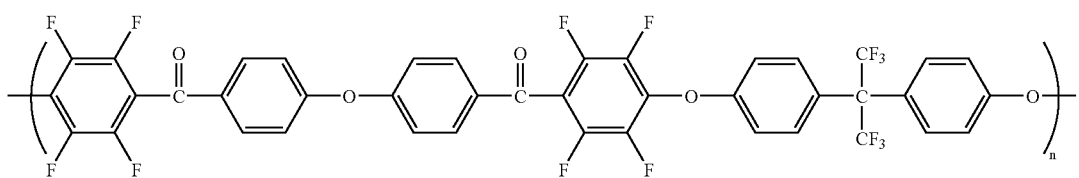
(18)

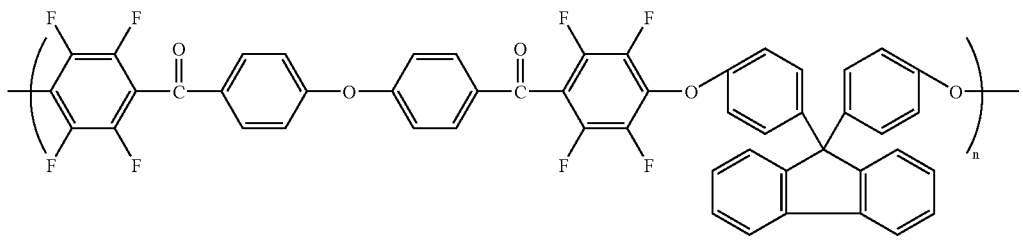
(19)

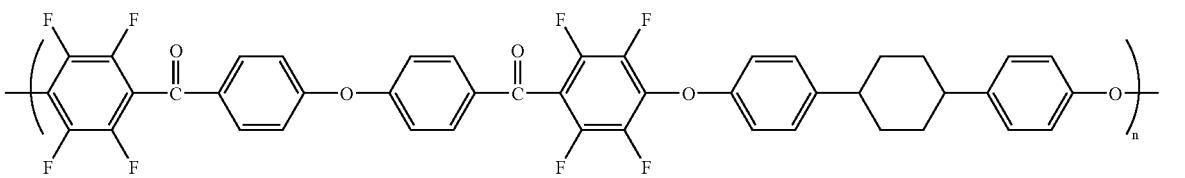
(20)

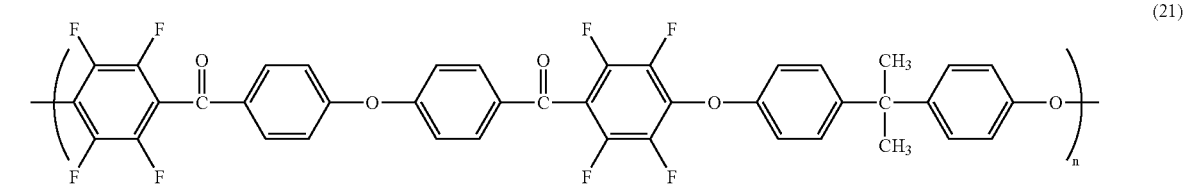
(21)

Other than the above, the polyamide or polyester may be, for example, polyamide or polyester described by JP H10 (1998)-508048 A, and their repeating units can be represented by the general formula (22) below.

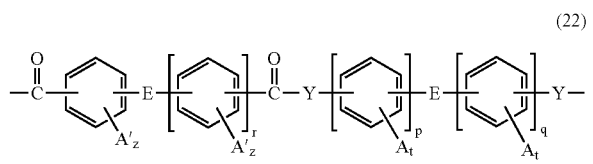
(22)

In the above formula (22), Y is O or NH. E is, for example, at least one group selected from the group consisting of a halogenated $C_{1-3}$ alkyl group, an alkoxy group represented by OR (wherein R is the group defined above), an aryl group, a substituted aryl group by halogenation, a $C_{1-9}$ alkoxycarbonyl group, a $C_{1-9}$ alkylcarbonyloxy group, a $C_{1-12}$ aryloxycarbonyl group, a $C_{1-12}$ arylcarbonyloxy group and a substituted derivative thereof, a $C_{1-12}$ arylcarbamoyl group, and a $C_{1-12}$ arylcarbonylamino group and a substituted derivative thereof. When there are plural As, they may be the same or different. The above-mentioned A' is selected from the group consisting of, for example, halogen, a $C_{1-3}$ alkyl group, a halogenated $C_{1-3}$ alkyl group, a phenyl group and a substituted phenyl group and when there are plural A's, they may be the same or different. A substituent on a phenyl ring of the substituted phenyl group can be, for example, halogen, a $C_{1-3}$ alkyl group, a halogenated $C_{1-3}$ alkyl group or a combination thereof. The t is an integer from 0 to 4, and the z is an integer from 0 to 3.

Among the repeating units of the polyamide or polyester represented by the formula (22) above, the repeating unit represented by the general formula (23) below is preferable.

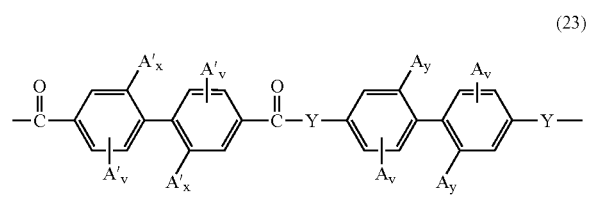

(23)

In the formula (23), A, A' and Y are as defined in the formula (22), and v is an integer from 0 to 3, preferably is an integer from 0 to 2. Although each of x and y is 0 or 1, not both of them are 0. Next, as mentioned above, the transparent polymer film has an in-plane retardation (Δnd) of not more than 50 nm, preferably not more than 20 nm, and more preferably, not more than 10 nm. In the present invention, an in-plane retardation (Δnd), a thickness direction retardation (Rth) and a birefringence (Δn) are represented by the following equations. When the transparent polymer film is a monolayer, the lower limit of the in-plane retardation (Δnd) is higher than 0. Therefore, it is preferable that the transparent polymer film has an in-plane retardation (Δnd) not more than 50 nm and more than 0 nm; more preferably, not more than 20 nm and more than 0 nm; further preferably, not more than 10 nm and more than 0 nm. In the following equations, nx, ny and nz are the same as those for the birefringent layer as mentioned above. That is, nx, ny and nz respectively indicate refractive indices in the X-, Y-, and Z-axes directions in the transparent polymer film. The X-axis direction is a direction showing a maximum refractive index within the plane of the transparent polymer film, the Y-axis direction is a direction perpendicular to the X-axis direction within the plane, and the Z-axis direction is a thickness direction and is perpendicular to the X- and Y-axes directions; d indicates a film thickness.

$\Delta nd = (nx-ny) \cdot d$ $Rth = \{(nx+ny)/2 - nz\} \cdot d$ $\Delta n = \{(nx+ny)/2 - nz\} \cdot d/d$ Materials of the transparent polymer film are not limited particularly but polymers with excellent transparency are preferred. Thermoplastic resins are preferred since they are suitable for stretching and shrinking treatments as mentioned below. Specific examples include acetate resin such as triacetylcellulose (TAC), polyester resin, polyethersulfone resin, polysulfone resin, polycarbonate resin, polyamide resin, polyimide resin, polyolefin resin, acrylic resin, polynorbornene (e.g., trade name: "ARTON" manufactured by JSR Corporation, and trade name: "ZEONOR" and "ZEONEX" manufactured by ZEON Corporation), cellulose resin, polyalylate resin, polystyrene resin, polyvinyl alcohol resin, polyvinyl chloride resin, polyvinylidene chloride resin, polyacrylic resin, and a mixture thereof. In addition, liquid crystal polymers and the like also can be used. Another example of the materials described in JP 2001-343529 A (WO 01/37007) is a mixture containing a thermoplastic resin whose side chain has a substituted or unsubtituted imido group and a thermoplastic resin whose side chain has a substituted or unsubtituted phenyl group and nitrile group, more specifically, a resin composition containing an alternating copolymer of isobutene and N-methylene maleimide and an acrylonitrile-styrene copolymer. Among them, it is particularly preferred for materials that birefringence of the transparent film formed using the materials become a relatively lower value. Specifically, a mixture of the above-mentioned thermoplastic resin whose side chain has a substituted or unsubstituted imide group and a thermoplastic resin whose side chain has substituted or unsubstituted phenyl group and a nitryl group is preferred. Among the above-mentioned resins, representative examples include cellulose-based polymer films such as triacetylcellulose (TAC) and norbornene-based polymer films (e.g., "ARTON" by JSR, "ZEONOR" and "ZEONEX" by ZEON Corporation).

The transparent polymer film has a thickness ranging, for example, from about 10 to 1000 μm, preferably from 20 to 500 μm, and more preferably from 30 to 100 μm. The transparent polymer film layer of the present invention can be formed by using a transparent polymer film that is previously provided with the in-plane retardation (Δnd) of the present invention. Even when the retardation is not within the predetermined range, it can be adjusted to the predetermined range by subjecting the transparent polymer to a treatment such as stretching and shrinking.

Next, a solution of the non-liquid crystalline polymer is coated to form a film on the transparent polymer film, and a solvent in the solution was removed by evaporation so as to form a birefringent layer.

The solvent of the solution to be coated is not particularly limited, but the examples thereof include halogenated hydrocarbons such as chloroform, dichloromethane, carbon tetrachloride, dichloroethane, tetrachloroethane, trichloroethylene, tetrachloroethylene, chlorobenzene and orthodichlorobenzene; phenols such as phenol and parachlorophenol; aromatic hydrocarbons such as benzene, toluene, xylene, methoxybenzene and 1,2-dimethoxybenzene; ketone-based solvents such as acetone, methyl ethyl ketone, methyl isobutyl ketone, cyclohexanone, cyclopentanone, 2-pyrrolidone and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether and tetrahydrofuran; or carbon disulfide, ethyl cellosolve or butyl cellosolve. These solvents may be used alone or in combination of two or more.

In the coating solution, various additives such as a stabilizer, a plasticizer, metal and the like may be blended further as necessary.

Moreover, the coating solution may contain other resins. Such resins can be, for example, resins for general purpose use, engineering plastics, thermoplastic resins and thermosetting resins.

The resins for general purpose use can be, for example, polyethylene (PE), polypropylene (PP), polystyrene (PS), polymethyl methacrylate (PMMA), an ABS resin, an AS resin or the like. The engineering plastics can be, for example, polyacetate (POM), polycarbonate (PC), polyamide (PA:nylon), polyethylene terephthalate (PET), polybutylene terephthalate (PBT) or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP) or the like. The thermosetting resins can be, for example, epoxy resins, phenolic novolac resins or the like.

When the additive resins or the like are blended in the coating solution, the blend percent to the polymer material is, for example, from 0 to 50 wt %, and preferably from 0 to 30 wt %.

The method of coating the solution is selected, for example, from spin coating, roller coating, flow coating, printing, dip coating, flow-expanding, bar coating and gravure printing. In the coating, a method of superimposing polymer layers can be used as required.

After the coating, the solvent in the solution is removed by evaporation through natural drying, air-drying, heat drying (e.g., 60 to 250° C.) and the like so as to form a film-like birefringent layer. This birefringent layer satisfies the condition represented by the above formula (1). Though there is no particular limitation, the birefringent layer has a thickness, for example, in a range from 0.1 to 50 µm, preferably from 0.5 to 30 µm, and more preferably from 1 to 20 µm from an aspect of reducing thickness of a liquid crystal display, viewing angle compensation, film homogeneity, and the like.

A birefringent layer of the present invention will have an optical uniaxiality (nx=ny>nz) when it is not subjected to treatments other than the layer-formation through evaporation-removal of the solvent in the non-liquid crystalline polymer solution. When it is subjected to a treatment as described below, for example, the layer can have a difference in the refractive indices (nx>ny) within the plane, in which case it will have an optical biaxiality (nx>ny>nz). For differentiating the refractive indices within the plane of the birefringent layer, for example, the following processes can be used. First, a transparent polymer film having an in-plane shrinkage in one direction is prepared. By coating the solution on the transparent polymer film and drying, the in-plane shrinkage of the transparent polymer film is used to provide a difference in the in-plane refractive indices to the thus formed birefringent layer. Alternatively, the difference in the in-plane refractive indices can be provided by coating the solution on the transparent polymer film applied with stress in one direction, or by forming a birefringent layer while blowing air in one direction to the coated solution. Alternatively, the difference in the in-plane refractive indices can be provided by coating the solution on an anisotropic transparent polymer film so as to form a birefringent layer. In a further alternative process, the birefringent layer is formed on the transparent polymer film layer, and then the laminate is stretched so as to provide a difference in the refractive indices within the plane of the birefringent layer. These processes can be used in combination.

In this manner, an optical film of the present invention can be obtained, which includes a transparent polymer film layer and a birefringent layer formed of a non-liquid crystalline polymer that are laminated together, satisfying the condition represented by the above formula (1), and the transparent polymer film layer has an in-plane retardation of not more than 50 nm. The optical film of the present invention can be produced through a process other than the above-mentioned ones. For example, an optical film can be formed by forming a film of the birefringent layer previously through T-die extrusion or the like and bonding it to a transparent polymer film. For the bonding, a pressure-sensitive adhesive or another adhesive can be used, for example.

In the present invention, the birefringent layer can be formed on one or both surface(s) of the transparent polymer film layer. The birefringent layer can be made of a monolayer or a multilayer structure of a single material or plural materials.

It is preferable that the optical film of the present invention further includes at least one of an adhesive layer and a pressure-sensitive adhesive layer in order to facilitate adhesion of the optical film of the present invention with the other members such as the other optical layers and a liquid crystal cell, and also to prevent the optical film of the present invention from peeling off. Accordingly, the adhesive layer and the pressure-sensitive adhesive layer are laminated preferably on the outermost surface of the optical film. More specifically, the layers may be laminated on one or both outermost surface(s) of the optical film.

Though there is no particular limitation on the material of the adhesive layer, examples of the materials used for the adhesive layer include a pressure-sensitive adhesive based on a polymer such as an acrylic, vinyl alcohol, silicone, polyester, polyurethane and polyether polymers, and also a rubber-based pressure-sensitive adhesive. Fine particles can also be blended into those materials in order to form an adhesive layer having a light-diffusion property. Among them, materials having excellent moisture-absorption and heat resistance are preferred. A liquid crystal display manufactured by using the materials will be excellent in quality and durability, since disadvantages such as foaming and peeling caused by moisture absorption, degradation in the optical properties and warping of the liquid crystal cell that are caused by a difference in the thermal expansion, can be prevented.

The optical film of the present invention can be used alone as mentioned above, or it can be combined with other optical members as required to make a laminate that will be applied to various optical uses. Specifically, it can be used as an optically-compensating member, or particularly for a visually-compensating member. Though not limited particularly, the other optical members include, for example, a polarizer as mentioned below.

A polarizing plate of the present invention is a laminated polarizing plate including an optical film and a polarizer, and it is characterized in that the optical film is the optical film of the present invention.

Figure 1:
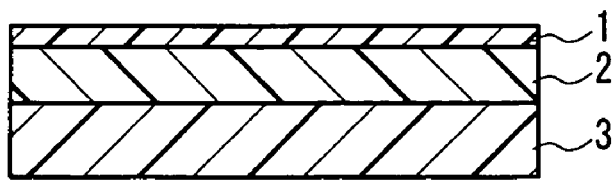
FIG. 1 is a schematic cross-sectional view showing an example of a polarizing plate of the present invention.
Figure 2:
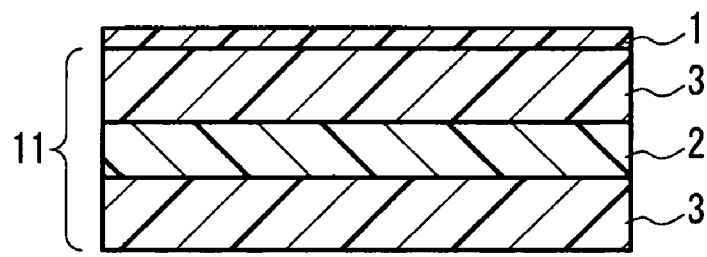
FIG. 2 is a schematic cross-sectional view showing another example of a polarizing plate of the present invention.

Though such a polarizing plate is not limited particularly in the structure as long as it has the optical film of the present invention, the examples thereof are shown in FIGS. 1 and 2. FIGS. 1 and 2 are cross-sectional views respectively showing examples of polarizing plates of the present invention, and identical reference numbers in the figures are provided for common elements. The polarizing plate of the present invention is not limited to the structure below but can include further optical members.

A polarizing plate as shown in FIG. 1 has an optical film 1 of the present invention, a polarizer 2 and a transparent protective layer 3. The optical film 1 is laminated on one surface (the upper surface in the figure) of the polarizer 2, and the transparent protective layer 3 is laminated on the other surface (the lower surface in the figure). Since the optical film 1 is a laminate of a birefringent layer and a transparent polymer film layer as mentioned above, any surface thereof can face the polarizer 2. When the transparent polymer film layer functions also as the transparent protective layer 3, the transparent polymer film layer is preferably in contact with the polarizer. The optical film 1, the polarizer 2 and the transparent protective layer 3 can be laminated, for example, by forming a pressure-sensitive adhesive layer or an adhesive layer between the respective layers.

A polarizing plate as shown in FIG. 2 has an optical film 1 of the present invention, a polarizer 2 and two transparent protective layers 3. The transparent protective layers 3 are laminated respectively on both surfaces of the polarizer 2, and the optical film 1 is further laminated on one of the transparent protective layers 3. Since the optical film 1 is a laminate of a birefringent layer and a transparent polymer film layer as mentioned above, any surface thereof can face the transparent protective layer 3.

The transparent protective layers can be laminated on both surfaces of the polarizer as shown in the figure, or a transparent protective layer can be laminated only on one surface of the polarizer. When laminating on both surfaces, the kinds of transparent protective layers can be the same or different.

The polarizer is not particularly limited but can be a film prepared by a conventionally known method of, for example, dyeing by allowing a film of various kinds to adsorb a dichroic material such as iodine or a dichroic dye, followed by cross-linking, stretching and drying. Especially, films that transmit linearly polarized light when natural light is made to enter those films are preferable, and films having excellent light-transmittance and polarization degree are preferable. Examples of the film of various kinds in which the dichroic material is to be adsorbed include hydrophilic polymer films such as polyvinyl alcohol (PVA)-based films, partially-formalized PVA-based films, partially-saponified films based on ethylene-vinyl acetate copolymer and cellulose-based films. Other than the above, polyene aligned films such as dehydrated PVA and dehydrochlorinated polyvinyl chloride can be used, for example. Among them, the PVA-based film is preferable. In addition, the thickness of the polarizing film generally ranges from 1 to 80 μm, though it is not limited to this.

The transparent protective layer is not particularly limited but can be a conventionally known transparent film. For example, transparent protective films having excellent transparency, mechanical strength, thermal stability, moisture shielding property and isotropism are preferable. Specific examples of materials for such a transparent protective layer can include cellulose-based resins such as triacetylcellulose, and transparent resins based on polyester, polycarbonate, polyamide, polyimide, polyethersulfone, polysulfone, polystyrene, polynorbornene, polyolefin, acrylic, acetate and the like. Thermosetting resins or ultraviolet-curing resins based on the acrylic, urethane, acrylic urethane, epoxy, silicones and the like can be used as well. Among them, a TAC film having a surface saponified with alkali or the like is preferable in view of the polarization property and durability.

The polymer film described in JP 2001-343529 A (WO 01/37007) also can be used for the transparent protective layer. The polymer material can be, for example, a resin composition containing a thermoplastic resin whose side chain has a substituted or unsubstituted imide group and a thermoplastic resin whose side chain has a substituted or unsubstituted phenyl group and nitrile group. An example thereof is a resin composition containing an alternating copolymer of isobutene and N-methylene maleimide and an acrylonitrile-styrene copolymer. The polymer film may be formed by extruding the resin composition.

It is preferable that the transparent protective layer is colorless. More specifically, a retardation value (Rth) of the film in its thickness direction as represented by the equation below preferably ranges from −90 nm to +75 nm, more preferably ranges from −80 nm to +60 nm, and particularly preferably ranges from −70 nm to +45 nm. When the retardation value is within the range of −90 nm to +75 nm, coloration (optical coloration) of the polarizing plate, which is caused by the protective film, can be solved sufficiently. In the equation below, nx, ny and nz are similar to those described above, and d indicates the film thickness. $Rth=[(nx+ny)/2-nz]\cdot d$ The transparent protective layer further may have an optically-compensating function. As such a transparent protective layer having the optically-compensating function, it is possible to use, for example, a known layer used for preventing coloration caused by changes in a visible angle based on retardation in a liquid crystal cell or for widening a preferable viewing angle. Specific examples include various films obtained by stretching the above-described transparent resins uniaxially or biaxially, an aligned film of a liquid crystal polymer or the like, and a laminate obtained by providing an aligned layer of a liquid crystal polymer on a transparent base. Among the above, the aligned film of a liquid crystal polymer is preferable because a wide viewing angle with excellent visibility can be achieved. Particularly preferable is an optically-compensating retardation plate obtained by supporting an optically-compensating layer with the above-mentioned triacetylcellulose film or the like, where the optically-compensating layer is made of an incline-aligned layer of a discotic or nematic liquid crystal polymer. This optically-compensating retardation plate can be a commercially available product, for example, "WV film" manufactured by Fuji Photo Film Co., Ltd. Alternatively, the optically-compensating retardation plate can be prepared by laminating two or more layers of the retardation film and the film support of triacetylcellulose film or the like so as to control the optical properties such as retardation.

The thickness of the transparent protective layer is not particularly limited but can be determined suitably according to retardation or protection strength, for example. In general, the thickness is in the range not greater than 500 μm, preferably from 5 to 300 μm, and more preferably from 5 to 150 μm.

The transparent protective layer can be formed suitably by a conventionally known method such as a method of applying the above-mentioned various transparent resins onto a polarizing film or a method of laminating the transparent resin film, the optically-compensating retardation plate or the like on the polarizing film, or can be a commercially available product.

The transparent protective layer further may be subjected to, for example, a hard-coating treatment, an antireflection treatment, treatments for anti-sticking, diffusion and anti-glaring and the like. The hard-coating treatment aims at preventing scratches on the surfaces of the polarizing plate, and is a treatment of, for example, providing a hardened coating film that is formed of a curable resin and has excellent hardness and smoothness onto a surface of the transparent protective layer. The curable resin can be, for example, ultraviolet-curing resins of silicone base, urethane base, acrylic, and epoxy base. The treatment can be carried out by a conventionally known method. The anti-sticking treatment aims at preventing adjacent layers from sticking to each other. The antireflection treatment aims at preventing reflection of external light on the surface of the polarizing plate, and can be carried out by forming a conventionally known antireflection layer or the like.

When external light is reflected on the surface of the polarizing plate, the reflection will inhibit visibility of light transmitted through the polarizing plate. The anti-glare treatment aims at preventing such inhibition of visibility. The anti-glare treatment can be carried out, for example, by providing microscopic asperities on a surface of the transparent protective layer by a conventionally known method. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide or the like. Other than the above, inorganic fine particles having an electrical conductivity or organic fine particles comprising, for example, crosslinked or uncrosslinked polymer particles can be used as well. The average particle diameter of the transparent fine particles ranges, for example, from 0.5 to 20 μm, though there is no particular limitation. In general, a blend ratio of the transparent fine particles preferably ranges from 2 to 70 parts by weight, and more preferably ranges from 5 to 50 parts by weight with respect to 100 parts by weight of the above-described transparent resin, though there is no particular limitation.

The anti-glare layer in which the transparent fine particles are blended can be used as the transparent protective layer itself or provided as a coating layer coated onto the transparent protective layer surface. Furthermore, the anti-glare layer also can function as a diffusion layer to diffuse light transmitted through the polarizing plate and thereby widen the viewing angle (i.e., visually-compensating function).

The antireflection layer, the anti-sticking layer, the diffusion layer and the anti-glare layer mentioned above can be laminated on the polarizing plate, as a sheet of optical layers comprising these layers, separately from the transparent protective layer.

The method of laminating the respective components (e.g., the optical film, the polarizer and the transparent protective layer) can be carried out by a conventionally known method, without any particular limitations. In general, a pressure-sensitive adhesive, an adhesive and the like as described above can be used, and the adhesive or the pressure-sensitive adhesive can be selected appropriately, depending on the kinds or the like of the respective components. The adhesive can be selected from polymeric adhesives based on acrylic, vinyl alcohol, silicone, polyester, polyurethane, polyether or the like, and rubber-based adhesives. It also is possible to use an adhesive containing a water-soluble crosslinking agent of vinyl alcohol-based polymers such as glutaraldehyde, melamine and oxalic acid. These pressure-sensitive adhesives and adhesives are difficult to peel off even under an influence of humidity or heat, and they are excellent in optical transparency and polarization degree. Specifically, a PVA-based adhesive is preferably used for a polarizer of a PVA-based film in view of its adhesion stability or the like. Such an adhesive or a pressure-sensitive adhesive can be applied directly to the surface of a polarizer or a transparent protective layer. Alternatively, a layer of the adhesive or the pressure-sensitive adhesive formed as a tape or a sheet can be arranged on the surface. When an adhesive or a pressure-sensitive adhesive is prepared as an aqueous solution, other additive(s) or catalyst(s) such as acid(s) can be blended as required. In application of the adhesive, an additive or a catalyst such as an acid can be blended into the aqueous solution of the adhesive. Though the thickness of the adhesive layer is not limited particularly, for example, it ranges from 1 nm to 500 nm, preferably from 10 nm to 300 nm, and more preferably from 20 nm to 100 nm. Any conventionally known methods for using adhesives such as acrylic polymers or vinyl alcohol-based polymers can be used without any particular limitations. Alternatively, the adhesive can contain a water-soluble crosslinking agents of PVA-based polymers, such as glutaraldehyde, melamine and oxalic acid. These adhesives are difficult to peel off even under an influence of humidity or heat, and they are excellent in optical transparency and polarization degree. For example, these adhesives can be coated as aqueous solutions on the surfaces of the respective components and dried before use. In the aqueous solution, for example, other additive(s) and catalyst(s) such as acids can be blended as required. Among them, for the adhesive, a PVA-based adhesive is preferred in light of the excellent adhesiveness to the PVA film.

The optical film of the present invention can be used in combination with a conventionally known optical member, for example, various retardation plates, diffusion-control films, and brightness-enhancement films, other than the above-mentioned polarizer. The retardation films can be films obtained by, for example, stretching a polymer uniaxially or biaxially, subjecting a polymer to Z-axis alignment, or coating a liquid crystal polymer on a base. The diffusion-control films can use films utilizing diffusion, scattering, and refraction for controlling viewing angles, or for controlling glaring and scattered light that will affect definition. The brightness-enhancement film may include a quarter wavelength plate ($\lambda/4$ plate) and a selective reflector of a cholesteric liquid crystal, and a scattering film using an anisotropic scatter depending on the polarization direction. Also, the optical film can be combined with a wire grid polarizer, for example.

The polarizing plate according to the present invention can include in use an additional optical layer together with the optical film of the present invention. Examples of the optical layers include various optical layers that have been conventionally known and used for forming liquid crystal displays or the like, such as a polarizing plate, a reflector, a semitransparent reflector, and a brightness-enhancement film as mentioned below. These optical layers can be used alone or in combination of at least two kinds of layers. Such an optical layer can be provided as a single layer, or at least two optical layers can be laminated. A laminated polarizing plate further including such an optical layer is used preferably as an integrated polarizing plate having an optical compensation function, and it can be arranged on a surface of a liquid crystal cell, for example, so as to be used suitably for various image displays.

The integrated polarizing plate will be described below. First, an example of a reflective polarizing plate or a semi-transparent reflective polarizing plate will be described. The reflective polarizing plate is prepared by laminating further a reflector on a polarizing plate of the present invention, and the semitransparent reflective polarizing plate is prepared by laminating a semitransparent reflector on a polarizing plate of the present invention.

In general, such a reflective polarizing plate is arranged on a backside of a liquid crystal cell in order to make a liquid crystal display (reflective liquid crystal display) to reflect incident light from a visible side (display side). The reflective polarizing plate has some merits, for example, assembling of light sources such as a backlight can be omitted, and the liquid crystal display can be thinned further.

The reflective polarizing plate can be formed in any known manner such as forming a reflector of metal or the like on one surface of a polarizing plate having a certain elastic modulus. More specifically, one example thereof is a reflective polarizing plate formed by matting one surface (surface to be exposed) of a transparent protective layer of the polarizing plate as required, and providing the surface with a deposited film or a metal foil comprising a reflective metal such as aluminum.

An additional example of a reflective polarizing plate is prepared by forming, on a transparent protective layer having a surface with microscopic asperities due to microparticles contained in various transparent resins, a reflector corresponding to the microscopic asperities. The reflector having a microscopic asperity surface diffuses incident light irregularly so that directivity and glare can be prevented and irregularity in color tones can be controlled. The reflector can be formed by attaching the metal foil or the metal deposited film directly on an asperity surface of the transparent protective layer in any conventional and appropriate methods including deposition and plating such as vacuum deposition, ion plating and sputtering.

As mentioned above, the reflector can be formed directly on a transparent protective layer of a polarizing plate. Alternatively, the reflector can be used as a reflecting sheet formed by providing a reflecting layer onto an appropriate film similar to the transparent protective film. Since a typical reflecting layer of a reflector is made of a metal, it is preferably used in a state such that the reflecting surface of the reflecting layer is covered with the film, a polarizing plate or the like in order to prevent a reduction of the reflection rate due to oxidation, and furthermore, the initial reflection rate is maintained for a long period, and a separate formation of a transparent protective layer is avoided.

A semitransparent polarizing plate is provided by replacing the reflector in the above-mentioned reflective polarizing plate by a semitransparent reflector, and it is exemplified by a half-mirror that reflects and transmits light at the reflecting layer.

In general, such a semitransparent polarizing plate is arranged on a backside of a liquid crystal cell. In a liquid crystal display including the semitransparent polarizing plate, incident light from the visible side (display side) is reflected to display an image when a liquid crystal display is used in a relatively bright atmosphere, while in a relatively dark atmosphere, an image is displayed by using a built-in light source such as a backlight on the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

The following description is about an example of a polarizing plate prepared by further laminating a brightness-enhancement film on a polarizing plate of the present invention.

A suitable example of the brightness-enhancement film is not particularly limited, but it can be selected from a multilayer thin film of a dielectric or a multilayer lamination of thin films with varied refraction aeolotropy that transmits linearly polarized light having a predetermined polarization axis while reflecting other light. Examples of such a brightness-enhancement film include trade name: "D-BEF" manufactured by 3M Co. Also a cholesteric liquid crystal layer, more specifically, an aligned film of a cholesteric liquid crystal polymer or an aligned liquid crystal layer fixed onto a supportive film base can be used as the brightness-enhancement film. Such a brightness-enhancement film reflects either clockwise or counterclockwise circularly polarized light while transmitting other light. Examples of such a brightness-enhancement film include trade name: "PCF 350" manufactured by Nitto Denko Corporation; trade name: "Transmax" manufactured by Merck and Co., Inc.

The above-mentioned various polarizing plates of the present invention can be, for example, an optical member formed by laminating a polarizing plate of the present invention and further at least two optical layers.

An optical member including a laminate of at least two optical layers can be formed, for example, by a method of laminating layers separately in a certain order for manufacturing a liquid crystal display or the like. However, efficiency in manufacturing a liquid crystal display can be improved by using an optical member that has been laminated previously because of its excellent stability in quality, assembling operability and the like. Any appropriate adhesives such as a pressure-sensitive adhesive layer can be used for lamination.

Moreover, it is preferable that the various polarizing plates further have a pressure-sensitive adhesive layer or an adhesive layer so as to allow easier lamination onto the other members such as a liquid crystal cell. They can be arranged on one surface or both surfaces of the polarizing plate. The material of the pressure-sensitive adhesive layer is not particularly limited but can be a conventionally known material such as acrylic polymers. Further, the pressure-sensitive adhesive layer having a low moisture absorption coefficient and an excellent thermal resistance is preferable from the aspects of prevention of foaming or peeling caused by moisture absorption, prevention of degradation in the optical properties and warping of a liquid crystal cell caused by difference in thermal expansion coefficients, and formation of a liquid crystal display with high quality and excellent durability. It is also possible to incorporate fine particles so as to form the pressure-sensitive adhesive layer showing light-diffusion property. For the purpose of forming the pressure-sensitive adhesive layer on the surface of the polarizing plate, a solution or melt of a sticking material can be applied directly on a predetermined surface of the polarizing plate by a development method such as flow-expansion and coating. Alternatively, a pressure-sensitive adhesive layer can be formed on a separator, which will be described below, in the same manner and transferred to a predetermined surface of the polarizing plate. Such a layer can be formed on any surface of the polarizing plate. For example, it can be formed on an exposed surface of the retardation plate of the polarizing plate.

When a surface of a layer of a pressure-sensitive adhesive or the like provided on the polarizing plate is exposed, preferably, the pressure-sensitive adhesive layer is covered with a separator until the time the pressure-sensitive adhesive layer is used so that contamination or the like will be prevented. The separator can be formed by coating, on a proper film such as the transparent protective film, at least one peeling layer including a peeling agent containing silicone, long-chain alkyl, fluorine, molybdenum sulfide or the like as required.

The pressure-sensitive adhesive layer or the like can be a monolayer or a laminate. The laminate can be a combination of monolayers different from each other in type or in composition. The pressure-sensitive adhesive layers arranged on both surfaces of the polarizing plate can be the same or different from each other in type or in composition.

The thickness of the pressure-sensitive adhesive layer can be determined appropriately depending on the constituents or the like of the polarizing plate. In general, the thickness of the pressure-sensitive adhesive layer is 1 µM to 500 µm.

It is preferable that the pressure-sensitive adhesive layer is made of a pressure-sensitive adhesive having excellent optical transparency and sticking characteristics such as wettability, cohesiveness, and adhesiveness. For specific example, the pressure-sensitive adhesive can be prepared appropriately based on polymers such as an acrylic polymer, a silicone-based polymer, polyester, polyurethane, polyether, and synthetic rubber.

Sticking characteristics of the pressure-sensitive adhesive layer can be controlled appropriately in a known manner. For example, the degree of cross-linkage and the molecular weight will be adjusted on the basis of a composition, molecular weight, crosslinking type, a content of the crosslinking functional group, and an amount of the blended crosslinking agent of the base polymer of the pressure-sensitive adhesive layer.

Transparent protective layers, optical layers and pressure-sensitive adhesive layers respectively for forming the above-mentioned optical films, the polarizing plates and various optical members (various polarizing plates with laminated optical layers) of the present invention can have ultraviolet absorption power as a result of treatment with an ultraviolet absorbent such as a salicylate compound, a benzophenone compound, a benzotriazole compound, a cyanoacrylate compound, and a nickel complex salt compound.

As mentioned above, the optical films and the polarizing plate according to the present invention can be used preferably for forming various devices such as liquid crystal displays. For example, an optical film or a polarizing plate of the present invention is arranged on at least one surface of a liquid crystal cell in order to form a liquid crystal panel used in a liquid crystal display of, e.g., a transmission type, a reflection type, or a transmission-reflection type.

The type of the liquid crystal cell for composing the liquid crystal display can be selected arbitrarily, and the examples thereof include various cells such as an STN (Super Twisted Nematic) cell, a TN (Twisted Nematic) cell, an IPS (In-Plane Switching) cell, a VA (Vertical Aligned) cell, an OCB (Optically Compensated Birefringence) cell, a HAN (Hybrid Aligned Nematic) cell, an ASAM (Axially Symmetric Aligned Microcell) cell, a ferroelectric-antiferroelectric cell, and those subjected to systematic alignment-division or those subjected to random alignment-division. Among them, since the optical film and polarizing plate of the present invention are particularly excellent for optical compensation of a VA cell and an OCB cell, they are used particularly preferably for viewing-angle compensating films for VA mode and OCB mode liquid crystal displays.

In general, the liquid crystal cell is composed of opposing liquid crystal cell substrates and a liquid crystal injected into a space between the substrates. The liquid crystal cell substrates can be made of glass, plastics or the like without any particular limitations. Materials for the plastic substrates can be selected from conventionally known materials without any particular limitations. When polarizing plates or optical members are arranged on both surfaces of a liquid crystal cell, they can be the same or different type. Moreover, for forming a liquid crystal display, one or more layers of appropriate members such as a prism array sheet, a lens array sheet, an optical diffuser and a backlight can be arranged at proper positions.

The liquid crystal display of the present invention is not particularly limited as long as it includes a liquid crystal panel and the liquid crystal panel of the present invention is used therefor. When it includes a light source, preferably, the light source is a flat light source emitting polarized light for enabling effective use of light energy, though there is no particular limitation.

Figure 3:
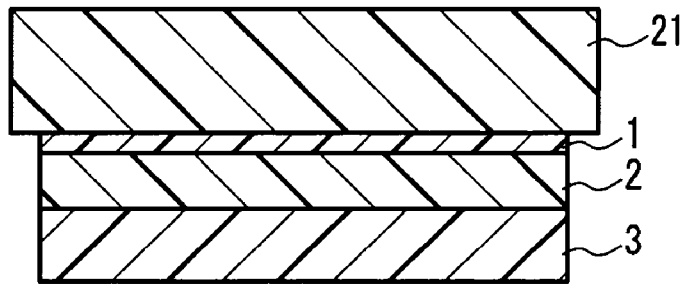
FIG. 3 is a schematic cross-sectional view showing an example of a liquid crystal display of the present invention.

FIG. 3 is a cross-sectional view showing one example of a liquid crystal panel of the present invention. As shown in this figure, the liquid crystal panel has a liquid crystal cell 21, an optical film 1, a polarizer 2 and a transparent protective layer 3, wherein the optical film 1 is laminated on one surface of the liquid crystal cell 21 while the polarizer 2 and the transparent protective layer 3 are laminated in this order on the other surface of the optical film 1. The liquid crystal cell is configured by holding a liquid crystal between two liquid crystal cell substrates (not shown). The optical film 1 is a laminate of a birefringent layer and a transparent polymer film layer as mentioned above, the birefringent layer side faces the liquid crystal cell 21, and the transparent polymer film side faces the polarizer 2.

The liquid crystal display of the present invention can include additionally on the visible side optical film (polarizing plate), for example, a diffusion plate, an anti-glare layer, an antireflection film, a protective layer, and a protective plate. Alternatively, a compensating retardation plate or the like can be disposed suitably between the liquid crystal cell and the polarizing plate in the liquid crystal panel.

The optical film and the polarizing plate of the present invention can be used not only in the above-described liquid crystal display but also in, for example, self-light-emitting displays such as an organic electroluminescence (EL) display, a PDP and a FED. When it is used in a self-light-emitting flat display, for example, the in-plane retardation values And of the birefringent optical film of the present invention are set to λ/4 in order to obtain circularly polarized light, and thus it can be used for an antireflection filter.

The following is a specific description of an electroluminescence (EL) display comprising the polarizing plate of the present invention. The EL display of the present invention is a display having the optical film or the polarizing plate of the present invention, and can be either an organic EL display or an inorganic EL display.

In recent EL displays, for preventing reflection from an electrode in a black state, use of an optical film such as a polarizer and a polarizing plate as well as λ/4 plate is proposed. The polarizing plate and the optical film of the present invention are especially useful when linearly polarized light, circularly polarized light or elliptically polarized light is emitted from an EL layer. The polarizing plate and the optical film of the present invention is especially useful even when an oblique light beam is partially polarized even in the case where natural light is emitted in a front direction.

First, a typical organic EL display will be explained below. In general, such an organic EL display has a ruminant (organic EL ruminant) that is prepared by laminating a transparent electrode, an organic ruminant layer and a metal electrode in this order on a transparent substrate. Here, the organic ruminant layer is a laminate of various organic thin films. Examples thereof include various combinations such as a laminate of a hole injection layer made of a triphenylamine derivative or the like and a luminant layer made of a fluorescent organic solid such as anthracene; a laminate of the ruminant layer and an electron injection layer made of a perylene derivative or the like; and a laminate of the hole injection layer, the ruminant layer and the electron injection layer.

In general, the organic EL display emits light according to the following principle: a voltage is applied to the anode and the cathode so as to inject holes and electrons into the organic ruminant layer, energy generated by the re-bonding of these holes and electrons excites the fluorescent substance, and the excited fluorescent substance emits light when it returns to the basis state. The mechanism of the re-bonding of these holes and electrons during the process is similar to that of an ordinary diode. This implies that current and the light emitting intensity show a considerable nonlinearity accompanied with a rectification with respect to the applied voltage.

It is required for the organic EL display that at least one of the electrodes is transparent so as to obtain luminescence at the organic ruminant layer. In general, a transparent electrode of a transparent conductive material such as indium tin oxide (ITO) is used for the anode. Use of substances having small impedance for the cathode is effective for facilitating the electron injection and thereby raising luminous efficiency, and in general, metal electrodes such as Mg—Ag and Al—Li can be used.

In an organic EL display configured as described above, it is preferable that the organic luminant layer usually is made of a film that is extremely thin such as about 10 nm, so that the organic luminant layer can transmit substantially all light as the transparent electrode does. As a result, when the layer does not illuminate, a light beam entering from the surface of the transparent substrate and passing through the transparent electrode and the organic ruminant layer is reflected at the metal layer so that it comes out again to the surface of the transparent substrate. Thereby, the display surface of the organic EL display looks like a mirror when viewed from exterior.

For example, an organic EL display of the present invention, which includes the organic EL ruminant, has a transparent electrode on the surface side of the organic ruminant layer, and a metal electrode on the backside of the organic ruminant layer. In the organic El display, it is preferable that an optical film (polarizing plate or the like) of the present invention is arranged on the surface of the transparent electrode, and furthermore, a λ/4 plate is arranged between the polarizing plate and an EL element. As described above, an organic EL display obtained by arranging an optical film of the present invention can suppress external reflection and improve the visibility. It is further preferable that a retardation plate is arranged between the transparent electrode and the optical film.

The retardation plate and the optical film (polarizing plate or the like) polarize, for example, light which enters from outside and is reflected by the metal electrode, and thus the polarization has an effect that the mirror of the metal electrode cannot be viewed from the outside. Particularly, the mirror of the metal electrode can be blocked completely by forming the retardation plate with a quarter wavelength plate and adjusting an angle formed by the polarization directions of the retardation plate and the polarizing plate to be π/4. That is, the polarizing plate transmits only the linearly polarized light component among the external light entering the organic EL display. In general, the linearly polarized light is changed into elliptically polarized light by the retardation plate. When the retardation plate is a quarter wavelength plate and when the angle is π/4, the light is changed into circularly polarized light.

This circularly polarized light passes through, for example, the transparent substrate, the transparent electrode, and the organic thin film. After being reflected by the metal electrode, the light passes again through the organic thin film, the transparent electrode and the transparent substrate, and turns into linearly polarized light at the retardation plate. Moreover, since the linearly polarized light crosses the polarization direction of the polarizing plate at a right angle, it cannot pass through the polarizing plate. Consequently, as described above, the mirror of the metal electrode can be blocked completely.

EXAMPLES

The following is a further description of the present invention by way of Examples and Comparative Examples. It should be noted that the present invention is not limited to these Examples alone. In the Examples and the like, the properties of the optical films were evaluated in the following manner.

(Measurement of Retardation Value Δnd, Precision in Alignment Axis)

A retardation value Δnd and a precision in alignment axis were measured with a retardation analyzer (trade name: "KOBRA-21ADH" manufactured by Oji Scientific Instruments).

(Measurement of Refractive Index)

A refractive index at a wavelength of 590 nm was measured with KOBRA-21ADH (trade name) manufactured by Oji Scientific Instruments.

(Measurement of Film Thickness)

The film thickness was measured with DIGITAL MICROMETER-K-351C (trade name) manufactured by Anritsu.

Example 1

Polyimide, which was synthesized from 2,2-bis(3,4-dicarboxyphenyl) hexafluoropropane dianhydride and 2,2'-bis(trifluoromethyl)-4,4'-diaminobiphenyl, having a weight average molecular weight Ww) of 70,000 and a birefringence (Δn) of about 0.04, was dissolved in MIBK (methyl isobutyl ketone) so as to obtain a solution whose solid concentration was 15 wt %. A triacetylcellulose (TAC) film was stretched transversely 1.3 times its original length at 150° C. in a fixed-end transverse stretching so as to have a thickness of 75 μm, and the solution was applied onto the TAC film. This TAC film had a Δnd of 20 nm. By a subsequent heat treatment at 100° C. for 10 minutes, a solvent in the solution was evaporated and removed to form a layer, and at the same time, the TAC film was shrunk to shrink the layer, thereby obtaining a perfectly-transparent and flat optical film. The thus obtained birefringent layer had an optical property nx>ny>nz.

Example 2

75 weight parts of an alternating copolymer made of isobutene and N-methyl maleimide (containing 50 mol % of N-methyl maleimide) and 25 weight parts of an acrylonitrile-styrene copolymer containing 28 wt % of acrylonitrile were dissolved in methylene chloride so as to obtain a solution whose solid concentration was 15 wt %. This solution was cast on a polyethylene terephthalate (PET) film covering a glass sheet, kept at room temperature for 60 minutes and subsequently peeled off from the PET film, which was then dried at 100° C. for 10 minutes and later 140° C. for 10 minutes, and further at 160° C. for 30 minutes, thereby obtaining a transparent film. The film had an in-plane retardation (Δnd) of 4 nm and Rth of 4 nm.

The solution as in Example 1 was applied onto the thus obtained transparent film. By a subsequent heat treatment at 100° C. for 5 minutes, a layer was formed on the transparent film, and thus a perfectly-transparent and flat film was obtained. By a 10% longitudinal uniaxial stretching of the thus obtained film at 130° C., an optical film was obtained. The birefringent layer of this optical film had an optical property nx>ny>nz.

Example 3

Polyimide, which was synthesized from 2,2-bis(3,4-dicarboxyphenyl) hexafluoropropane dianhydride and 2,2'-bis(trifluoromethyl)-4,4'-diaminobiphenyl, having a birefringence (Δn) of about 0.05, was dissolved in ethyl acetate so as to obtain a solution whose solid concentration was 20 wt %. This solution was applied onto the base as in Example 1. By a subsequent heat treatment at 130° C. for 5 minutes, a solvent in the solution was removed by evaporation so as to form a layer, and at the same time, the layer was shrunk to provide a perfectly-transparent and flat optical film. The birefringent layer of this optical film had an optical property nx>ny>nz.

Example 4

Polyetherketone ("Polyaryletherketone A" manufactured by Nippon Shokubai Co., Ltd.) represented by the following chemical formula (18) and having a birefringence (Δn) of about 0.03 was dissolved in MIBK so as to prepare a solution whose solid concentration was 20 wt %. A triacetylcellulose (TAC) film was stretched transversely 1.3 times its original length at 130° C. in a fixed-end transverse stretching so as to have a thickness of 75 μM, and the solution was applied onto the TAC film. This TAC film had a Δn of 15 nm. By a subsequent heat treatment at 100° C. for 10 minutes, a solvent in the solution was removed by evaporation so as to form a layer, and at the same time, the layer was shrunk to obtain a perfectly-transparent and flat optical film. The birefringent layer of this optical film had an optical property nx>ny>nz.

Comparative Example 1

The solution as in Example 1 was applied onto a PET film having a thickness of 75 μm and Δnd=4000 nm. By a subsequent heat treatment at 150° C. for 10 minutes, a solvent in the solution was removed by evaporation so as to form a birefringent layer, thereby obtaining a perfectly-transparent and flat optical film. The birefringent layer of the optical film had an optical property nx=ny>nz. However, due to an excessive difference in the in-plane retardation of the PET film, the optical film had problems in the optical properties, and thus, the birefringent layer must be peeled off from the PET film and transferred to an optical member such as a polarizer before use.

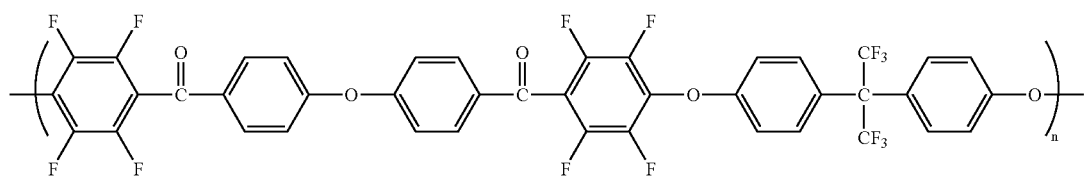

(18)

Example 5

The solution as in Example 1 was applied onto a triacetylcellulose (TAC) film having a thickness of 80 μm. This TAC film had a Δn of 5 nm. By a subsequent heat treatment at 100° C. for 10 minutes, a solvent in the solution was removed by evaporation so as to form a layer, thereby forming a perfectly-transparent and flat film. This film was stretched uniaxial-longitudinally by 10% its original length at a temperature of 150° C., thereby providing a difference in refractive indices within the plane of the layer so as to obtain an optical film. The birefringent layer of this optical film had an optical property nx>ny>nz.

Example 6

The solution as in Example 1 was applied onto a triacetylcellulose (TAC) film having a thickness of 80 μm. This TAC film had a Δn of 5 nm. By a subsequent heat treatment at 100° C. for 10 minutes, the solvent in the solution was removed by evaporation so as to form a birefringent layer, thereby forming a perfectly-transparent and flat film. The birefringent layer of this optical film had an optical property nx=ny>nz.

Example 7

Polyimide, which was synthesized from 4,4'-bis(3,4-dicarboxyphenyl)-2,2-diphenylpropane dianhydride and 2,2'-dichloro-4,4'-diaminobiphenyl, having a weight average molecular weight (Mw) of 30,000, was dissolved in cyclopentanone so as to obtain a solution whose solid concentration was 20 wt %. This solution was applied onto the TAC film that had been treated as in Example 1. By a subsequent heat treatment at 140° C. for 10 minutes, a solvent in the solution was removed by evaporation, and at the same time, the layer was shrunk to obtain a perfectly-transparent and flat optical film. The birefringent layer of this optical film had an optical property nx>ny>nz.

Comparative Example 2

The solution as in Example 1 was applied onto a TAC film that had a thickness of 150 μm as a result of being stretched transversely 1.5 times its original length at 150° C. in a free-end longitudinal stretching. This TAC film had a Δnd of 70 nm. By a subsequent heat treatment at 100° C. for 10 minutes, a solvent in the solution was removed by evaporation so as to form a birefringent layer, thereby obtaining a perfectly-transparent and flat optical film. The birefringent layer of this optical film had an optical property nx=ny>nz. However, due to an excessive difference in the in-plane retardation of the PET film, the optical film had problems in the optical properties, and thus, the birefringent layer must be peeled off from the PET film and transferred to an optical member such as a polarizer before use.

Table 1 below shows results of measurements for thickness, in-plane retardation A(Δnd) of the optical films, in-plane retardation B(Δnd) of the transparent polymer films, birefringence (Δn (a)) of the birefringent layers, and birefringence (Δn (b)) of the transparent polymer films of the optical films obtained in the respective Examples and Comparative Examples.

TABLE 1

|  | Thickness(μm) | A(Δnd) | B(Δnd) | Δn(a) | Δn(b) |
|---|---|---|---|---|---|
| Example 1 | 6 | 135 | 20 | 0.04 | 0.0006 |
| Example 2 | 6 | 120 | 4 | 0.04 | 0.001 |
| Example 3 | 10 | 70 | 20 | 0.05 | 0.0006 |
| Example 4 | 10 | 80 | 15 | 0.03 | 0.0006 |
| Example 5 | 8 | 150 | 20 | 0.04 | 0.0006 |
| Example 6 | 6 | 0.3 | 5 | 0.04 | 0.0006 |
| Example 7 | 6 | 130 | 20 | 0.025 | 0.0006 |
| Com.Ex. 1 | 6 | 0.9 | 4000 | 0.04 | 0.08 |
| Com.Ex. 2 | 6 | 150 | 70 | 0.04 | 0.0007 |

*Com.Ex.: Comparative Example

Figure 5:
FIG. 5 is a photocopy for evaluating a rainbow-colored irregularity in an Example for an optical film of the present invention.

Regarding the optical films obtained in the respective Examples and Comparative Examples, the liquid crystal display characteristics (LCD characteristics) were examined. First, the optical film and a polarizing plate (trade name: "HEG1425DU" manufactured by Nitto Denko Corporation) were laminated through an acrylic pressure-sensitive adhesive so as to obtain a polarizing plate integrated with an optically-compensating layer. This was adhered to the backlight side of a liquid crystal cell so that the polarizing plate faces outwards, thereby producing a liquid crystal display. And the front contrasts for the liquid crystal displays were examined. The results are shown in Table 2 below. For Example 1 and Comparative Example 1, occurrence of rainbow-colored irregularities was examined. The results are shown in the photocopies of FIG. 5 (Example 1) and FIG. 6 (Comparative Example 1). The front contrasts were measured in the following manner.

(Front Contrast)

A white image and a black image were displayed on the liquid crystal display, and the values of Y, x and y in an XYZ display system on the front of the display screen were measured respectively by using an instrument (trade name: "Ez contrast 160D" manufactured by ELDIM SA.). Based on the Y-value ($Y_W$) for the white image and the Y-value ($Y_B$) for the black image, the contrast ratio ($Y_W/Y_B$) at the front (viewing angle: 0°) was calculated.

TABLE 2

|  | Front contrast * |
|---|---|
| Example 1 | o |
| Example 2 | o |
| Example 3 | o |
| Example 4 | o |
| Example 5 | o |
| Example 6 | o |
| Example 7 | o |
| Com.Ex. 1 | x |
| Com.Ex. 2 | x |

*: In Table 2, o indicates that the contrast ratio is 100 or more, and x indicate the contrast ratio is lower than 100.

Figure 6:
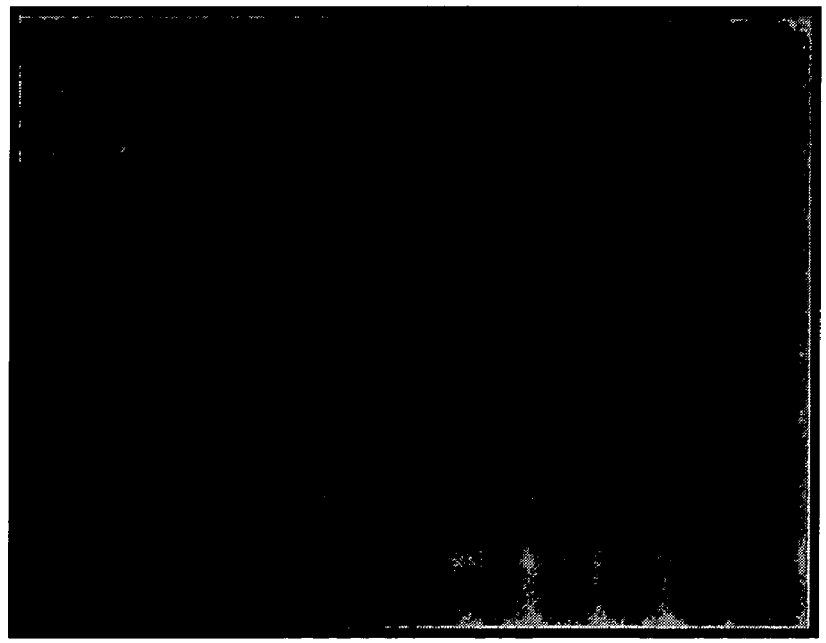
FIG. 6 is a photocopy for evaluating a rainbow-colored irregularity for an optical film of a Comparative Example.

As indicated in Table 2, all of Examples provided excellent contrasts and viewing-angle characteristics. On the contrary, there were problems in the contrasts in Comparative Examples. Furthermore, as shown in FIG. 5, no rainbow-colored irregularity occurred in Example 1. On the contrary, as shown in FIG. 6, a rainbow-colored irregularity occurred in Comparative Example 1.

INDUSTRIAL APPLICABILITY

As mentioned above, the optical film of the present invention has excellent optical properties, and the optical film can be produced easily at a low cost. Therefore, the optical film of the present invention can be useful as an optical member of a display apparatus such as a liquid crystal display and a self-light-emitting display.

The invention claimed is:

1. An optical film comprising a transparent polymer film layer and a birefringent layer formed of a non-liquid crystalline polymer that are laminated together, wherein the birefringent layer satisfies conditions represented by the following formulas (1) and (2), and the transparent polymer film layer has an in-plane retardation of not more than 50 nm:

$$nx \geq ny > nz \quad (1)$$

$$\Delta n(a) > \Delta n(b) \times 10 \quad (2)$$

in the formula (1), nx, ny and nz indicate respectively refractive indices in an X-axis direction, a Y-axis direction and a Z-axis direction in the birefringent layer;

the X-axis direction is a direction showing a maximum refractive index within the plane of the birefringent layer, the Y-axis direction is a direction perpendicular to the X-axis direction within the plane, and the Z-axis direction is a thickness direction and is perpendicular to the X-axis direction and the Y-axis direction, and in the formula (2), $\Delta n(a)$ indicates a birefringence of the birefringent layer and $\Delta n(b)$ indicates a birefringence of the transparent polymer film layer.

2. An optical film comprising a transparent polymer film layer and a birefringent layer formed of a non-liquid crystalline polymer that are laminated together, wherein the birefringent layer satisfies a condition represented by the following formula (1), and the transparent polymer film layer has an in-plane retardation of not more than 50 nm, and a birefringence ($\Delta n$) of the entire optical film is in a range of 0.0005 to 0.5:

$$nx \geq ny > nz \quad (1)$$

in the formula (1), nx, ny and nz indicate respectively refractive indices in an X-axis direction, a Y-axis direction and a Z-axis direction in the birefringent layer;

the X-axis direction is a direction showing a maximum refractive index within the plane of the birefringent layer, the Y-axis direction is a direction perpendicular to the X-axis direction within the plane, and the Z-axis direction is a thickness direction and is perpendicular to the X-axis direction and the Y-axis direction.

3. The optical film according to claim 1 or 2, wherein the non-liquid crystalline polymer for forming the birefringent layer is at least one kind of polymer selected from the group consisting of polyamide, polyimide, polyester, polyetherketone, polyamideimide and polyesterimide.

4. The optical film according to claim 1 or 2, wherein a resin for forming the transparent polymer film layer is at least one resin selected from the group consisting of acetate resin, polyester resin, polyethersulfone resin, polysulfone resin, polycarbonate resin, polyamide resin, polyimide resin, polyolefin resin, acrylic resin, polynorbomene resin, cellulose resin, polyarylate resin, polystyrene resin, polyvinyl alcohol resin, polyvinyl chloride resin, polyvinylidene chloride resin, polyacrylic resin, a mixed resin thereof; a liquid crystal polymer; and a mixture of a thermoplastic resin whose side chain has a substituted or unsubstituted imide group and a thermoplastic resin whose side chain has a substituted or unsubstituted phenyl group and a nitrile group.

5. The optical film according to claim 1 or 2, wherein the resin for forming the transparent polymer film layer is at least one of triacetylacetate and a mixed resin of an alternating copolymer composed of isobutene and N-methylene maleimide and an acrylonitrilestyrene copolymer.

6. The optical film according to claim 1 or 2, wherein the transparent polymer film layer is produced by shaping a material resin into a film and stretching.

7. The optical film according to claim 1 or 2, wherein the transparent polymer film layer is used as a transparent protective film for a polarizing plate.

8. A polarizing plate comprising an optical film and a polarizer, wherein the optical film is of claim 1 or 2.

9. The polarizing plate according to claim 8, wherein the transparent polymer film layer of the optical film functions also as a transparent protective film of the polarizing plate.

10. The polarizing plate according to claim 8, wherein the optical film functions as an opticallycompensating layer.

11. A liquid crystal panel comprising a liquid crystal cell and an optical member, wherein the optical member is disposed on at least one surface of the liquid crystal cell, and is the polarizing plate according to claim 8.

12. The liquid crystal panel according to claim 11, wherein the liquid crystal cell is at least one selected from the group consisting of an STN (Super Twisted Nematic) cell, a TN (Twisted Nematic) cell, an IPS (In-Plane Switching) cell, a VA (Vertical Aligned) cell, an OCB (Optically Compensated Birefringence) cell, a HAN (Hybrid Aligned Nematic) cell, and an ASAM (Axially Symmetric Aligned Microcell) cell.

13. A liquid crystal display comprising a liquid crystal panel according to claim 11.

14. A selflightemitting display comprising the polarizing plate according to claim 8.

15. An organic EL display comprising the polarizing plate according to claim 8.

16. A liquid crystal panel comprising a liquid crystal cell and an optical member, wherein the optical member is disposed on at least one surface of the liquid crystal cell, and is the optical film according to claim 1 or 2.

17. The liquid crystal panel according to claim 16, wherein the liquid crystal cell is at least one selected from the group consisting of an STN (Super Twisted Nematic) cell, a TN (Twisted Nematic) cell, an IPS (In-Plane Switching) cell, a VA (Vertical Aligned) cell, an OCB (Optically Compensated Birefringence) cell, a HAN (Hybrid Aligned Nematic) cell, and an ASAM (Axially Symmetric Aligned Microcell) cell.

18. A liquid crystal display comprising a liquid crystal panel according to claim 16.

19. A selflightemitting display comprising the optical film according to claim 1 or 2.

20. An organic EL display comprising the optical film according to claim 1 or 2.

21. The optical film according to claim 1 or 2, wherein the transparent polymer film layer is a monolayer, the transparent polymer film layer has an in-plane retardation of higher than 0 and not more than 50 nm.

22. A method for producing an optical film comprising a transparent polymer film layer and a birefringent layer that are laminated together, the method comprising:
    preparing or providing the transparent polymer film having an inplane retardation of not more than 50 nm;
    applying a nonliquid crystalline polymer solution on the transparent polymer film;
    evaporating and removing a solvent in the solution so as to form the birefringent layer; and
    adjusting the birefringent layer so as to satisfy conditions represented by the following formulas (1) and (2):

$$nx \geq ny > nz \quad (1)$$

$$\Delta n(a) > \Delta n(b) \times 10 \quad (2)$$

in the formula (1), nx, ny and nz indicate respectively refractive indices in an X-axis direction, a Y-axis direction and a Z-axis direction in the birefringent layer; the X-axis direction is a direction showing a maximum refractive index within the plane of the birefringent layer, the Y-axis direction is a direction perpendicular to the X-axis direction within the plane, and the Z-axis direction is a thickness direction and is perpendicular to the X-axis direction and the Y-axis direction, and in the formula (2), $\Delta n(a)$ indicates a birefringence of the birefringent layer and $\Delta n(b)$ indicates a birefringence of the transparent polymer film layer.

23. A method for producing an optical film comprising a transparent polymer film layer and a birefringent layer that are laminated together, the method comprising:
    preparing or providing the transparent polymer film having an in-plane retardation of not more than 50 nm;
    applying a non-liquid crystalline polymer solution on the transparent polymer film;
    evaporating and removing a solvent in the solution so as to form the birefringent layer; and
    adjusting the birefringent layer so as to satisfy a condition represented by the following formula (1), and a birefringence ($\Delta n$) of the entire optical film is in a range of 0.0005 to 0.5:

$$nx \geq ny > nz \quad (1)$$

in the formula (1), nx, ny and nz indicate respectively refractive indices in an X-axis direction, a Y-axis direction and a Z-axis direction in the birefringent layer;
    the X-axis direction is a direction showing a maximum refractive index within the plane of the birefringent layer, the Y-axis direction is a direction perpendicular to the X-axis direction within the plane, and the Z-axis direction is a thickness direction and is perpendicular to the X-axis direction and the Y-axis direction.

24. The method according to claim 22 or 23, wherein the nonliquid crystalline polymer for forming the birefringent layer is at least one kind of polymer selected from the group consisting of polyamide, polyimide, polyester, polyetherketone, polyamideimide and polyesterimide.

25. The method according to claim 22 or 23, wherein a resin for forming the transparent polymer film layer is at least one resin selected from the group consisting of acetate resin, polyester resin, polyethersulfone resin, polysulfone resin, polycarbonate resin, polyamide resin, polyimide resin, polyolefin resin, acrylic resin, polynorbornene resin, cellulose resin, polyarylate resin, polystyrene resin, polyvinyl alcohol resin, polyvinyl chloride resin, polyvinylidene chloride resin, polyacrylic resin, a mixed resin thereof; a liquid crystal polymer;
    and a mixture of a thermoplastic resin whose side chain has a substituted or unsubstituted imide group and a thermoplastic resin whose side chain has a substituted or unsubstituted phenyl group and a nitrile group.

26. The method according to claim 22 or 23, wherein the resin for forming the transparent polymer film layer is at least one of triacetylacetate and a mixed resin of an alternating copolymer composed of isobutene and N-methylene maleimide and an acrylonitrilestyrene copolymer.

27. The method according to claim 22 or 23, wherein the transparent polymer film layer is produced by shaping a material resin into a film and then stretching.

28. The method according to claim 22 or 23, wherein the transparent polymer film layer and the birefringent layer are laminated, and then the laminate is stretched or shrunk.

29. The method according to claim 22 or 23, wherein the transparent polymer film layer is a monolayer, the transparent polymer film layer has an in-plane retardation of higher than 0 and not more than 50 nm.

* * * * *

UNITED STATES PATENT AND TRADEMARK OFFICE
CERTIFICATE OF CORRECTION

PATENT NO.        : 7,428,029 B2
APPLICATION NO. : 10/522380
DATED             : September 23, 2008
INVENTOR(S)       : Nao Murakami et al.

It is certified that error appears in the above-identified patent and that said Letters Patent is hereby corrected as shown below:

Title Page:

Item 56 change

"FOREIGN PATENT DOCUMENTS

EP     1 160 591 A1 *  5/2001"

To be

--FOREIGN PATENT DOCUMENTS

EP     1 160 591 A1 *  5/2001

CN     1 337 009 A *   2/2002--

Signed and Sealed this

Twenty-fourth Day of March, 2009

JOHN DOLL
*Acting Director of the United States Patent and Trademark Office*